United States Patent
Lawson et al.

(10) Patent No.: US 6,352,394 B1
(45) Date of Patent: Mar. 5, 2002

(54) FLEX DRIVE TOOL

(75) Inventors: Gerald P. Lawson; David H. Arnold, both of Winona, MN (US)

(73) Assignee: DCM, Tech, Winona, MN (US)

( * ) Notice: Subject to any disclaimer, the term of this patent is extended or adjusted under 35 U.S.C. 154(b) by 0 days.

(21) Appl. No.: 09/302,135

(22) Filed: Apr. 29, 1999

(51) Int. Cl.⁷ .......................... B23B 31/36; B23B 41/12
(52) U.S. Cl. ...................... 408/127; 408/82; 408/83.5; 81/177.75; 279/16
(58) Field of Search .............................. 408/79, 80, 81, 408/127, 713, 83.5, 82; 81/177.75, 177.8, 177.9; 279/16; 403/90, 138, 144

(56) References Cited

U.S. PATENT DOCUMENTS

| | | | |
|---|---|---|---|
| 1,677,465 A | * 7/1928 | Thaete | |
| 1,855,558 A | * 4/1932 | Payne | 403/144 |
| 2,860,421 A | * 11/1958 | Smith | 33/191 |
| 3,461,775 A | * 8/1969 | Devanney et al. | 90/12.5 |
| 3,674,281 A | 7/1972 | Hedrick | 279/30 |
| 3,728,940 A | * 4/1973 | Peterson | 408/83.5 |
| 3,757,637 A | 9/1973 | Eich et al. | 90/17 |
| 4,365,419 A | 12/1982 | Ingels | 33/185 |
| 4,384,811 A | 5/1983 | Eckstein et al. | 409/215 |
| 4,439,075 A | * 3/1984 | Wiederkehr | 279/16 |
| 4,825,734 A | * 5/1989 | Schwalbe et al. | 80/177.9 |
| 4,842,457 A | 6/1989 | Badagnani | 400/183 |
| 4,882,829 A | 11/1989 | Dawe | 29/251 |
| 5,017,062 A | * 5/1991 | Leroux et al. | 408/83.5 |
| 5,188,189 A | * 2/1993 | Hummel | 81/177.8 |
| 5,280,740 A | * 1/1994 | Ernst | 81/177.7 |
| 5,399,058 A | * 3/1995 | Harmand | 408/80 |
| 5,752,706 A | * 5/1998 | Hodges | 279/16 |
| 5,769,576 A | 6/1998 | Gerard et al. | 408/83.5 |
| 5,906,458 A | * 5/1999 | Planche | 408/197 |
| 6,033,161 A | * 3/2000 | Scheufler, Jr. | 408/201 |
| 6,092,441 A | * 7/2000 | Jarvis | 81/177.75 |

* cited by examiner

Primary Examiner—Steven C. Bishop
(74) Attorney, Agent, or Firm—Vidas, Arrett & Steinkraus, P.A.

(57) ABSTRACT

The present invention provides for a readily exchangeable flex tool for machining a workpiece. The flex tool includes a driver and an tool carrying body. The driver is coupled to the tool carrying body in a manner which allows the tool carrying body to have at least two degrees of freedom with respect to the driver. The tool carrying body includes an elongate pilot shaft, the elongate pilot shaft and tool carrying body having a longitudinal axis. The at least two rotational degrees of freedom allowing the longitudinal axis of the tool carrying body and elongate pilot shaft to be aligned with a longitudinal axis of a reference bore contained in the workpiece and slidably inserted therein.

24 Claims, 4 Drawing Sheets

FLEX DRIVE TOOL

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a readily exchangeable, guidable tool such as those used in machining applications. Specifically, the present invention is directed to a rapid centering, misalignment tolerant, machining tool.

It is well known in the machining art that multiple machining operations require repositioning of the workpiece or repositioning of the machine spindle to precisely align the center line of a work piece reference bore with the centerline of the machine spindle, thereby ensuring a concentric and longitudinal orientation of the machining tool. When the alignment angle between the reference bore and the spindle is not accurate, a misalignment angle between the tool and workpiece results. This misalignment angle may result in the tool providing inaccurate or uneven machining. To prevent this, either the work piece or the machining spindle must be realigned, relative to one another, so as to negate the misalignment angle. To reposition the machine spindle generally requires manual realignment of the machine spindle relative to the workpiece or repositioning the workpiece relative to the machine spindle. Such repositioning is generally impractical as well as time consuming, and therefore expensive. To avoid the necessity of precisely realigning either the entire machine or the workpiece it would be desirable to have an invention which automatically repositions the tool carrying body alone thereby properly aligning the machining tool with the workpiece even when a misalignment angle is present and without requiring repositioning of the entire machine or workpiece.

To accomplish such a 'tool only' realignment, the present invention utilizes a flex joint between the machine driver and the tool carrying body. The tool carrying body contains an adjustable pilot shaft along. The pilot shaft engages a reference bore in the workpiece. This inventive configuration allows the tool carrying body to shift position as needed in order to ensure proper alignment between the tool and the workpiece. The specific components and functioning of the present flex tool are discussed in greater detail below.

BRIEF SUMMARY OF THE INVENTION

The present invention includes a tool carrying body which may be attached to a driver utilizing a flex joint. The tool carrying body contains an elongate pilot shaft which has a lower portion that may be slidably received into an existing reference bore of a workpiece. The upper portion of the elongate pilot shaft is adjustably or fixedly retained by the tool carrying body. The flex joint between the tool carrying body and the driver is coupled together by a guide collar which is loosely secured about the tool carrying body and removably secured to the driver. The guide collar is configured to be readily secured and removed to and from the driver. This provides the present invention to include tool carrying bodies with various characteristics to be readily interchanged on a driver. The guide collar provides a clearance between itself and the tool carrying body. The width of the clearance or the distance between the tool carrying body and the guide collar determines the amount of restriction to the range of motion of the tool carrying body. In addition the upper portion of the elongate pilot shaft may be configured to upwardly protrude through the tool carrying body in order to potentially engage the driver and thereby restrict the range of motion of the tool carrying body as well. Generally, the tool carrying body will have at least two degrees of rotational freedom which can be designed to provide any desired range of motion. In a preferred embodiment the range of motion of the tool carrying body may be restricted by the guide collar to between 0 and 15 degrees.

The combination of the flex joint and guide collar result in a flex tool which is capable of compensating for a wide range of misalignment angles between the centerline of the driver (i.e. spindle) and the centerline of the workpiece reference bore, by allowing the tool carrying body to be oriented with the reference bore via the inserted pilot shaft within the range determined by the guide collar. The flex joint between the tool carrying body and the driver provides the flex tool with the ability to compensate for misalignment angles between the driver and the workpiece reference bore without having to realign the entire machine or work piece surface.

In light of the aforementioned features, it is a goal of the present invention to provide for a flex tool capable of compensating for misalignment angles which may be present between the orientation of the longitudinal axis of a machine spindle and the longitudinal axis of a reference bore of a workpiece by realigning only the tool carrying body of the flex tool as opposed to the entire machining apparatus or work piece

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
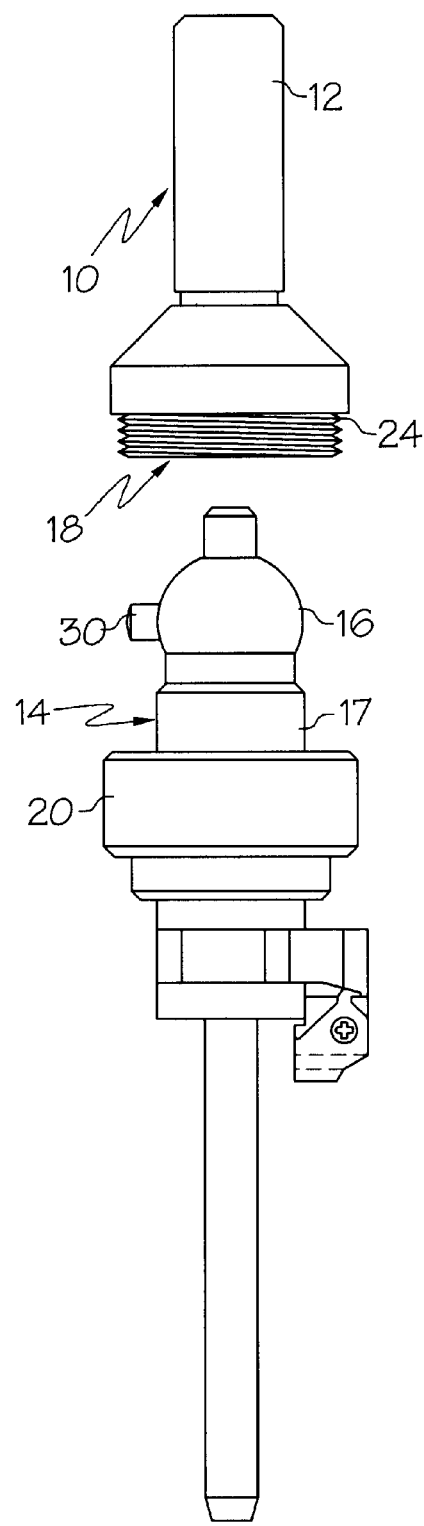
FIG. 1 is a side view perspective of the flex tool prior to coupling the guide collar to the driver.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

In FIG. 1 the primary components of the present invention are shown prior to assembly. The driver 10 has a spindle shaft 12 which, when used with a typical machining apparatus is fixedly connected to a machine spindle (not shown).

Figure 2:
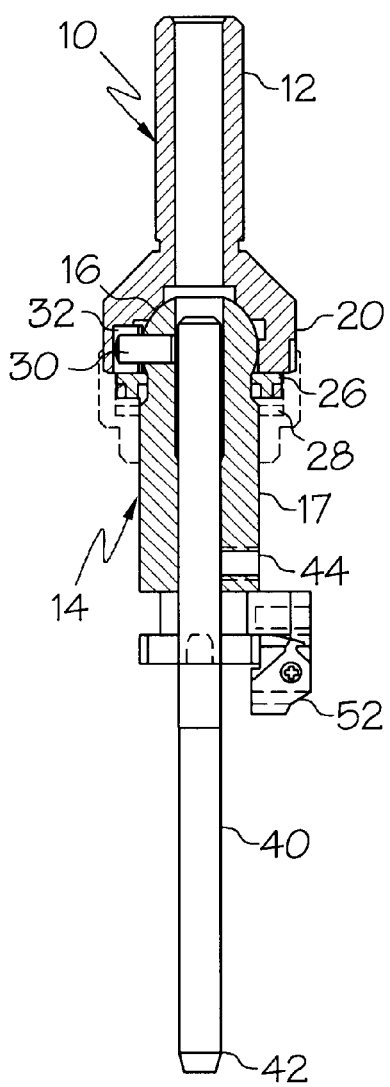
FIG. 2 is a side view perspective of the flex tool showing the connected flex joint and the guide collar coupled to the driver.

When the flex tool is fully assembled, as indicated generally at 60 as shown in FIG. 2, the driver 10 is coupled to a tool carrying body 14. The tool carrying body 14 has a substantially spherical upper portion or insert 16 and a lower portion 17. Insert 16 is inserted into a upper portion or insert receiving region 18 of the driver 10. In the embodiment shown and described herein, the connection of insert 16 and insert receiving region 18 results in flex joint having a ball-joint type configuration. It should be understood that the present invention may utilize any other flexible connection to achieve the desired rotational freedom for the tool carrying body as described herein. The insert receiving region 18 has a conical shape to ensure a continuous fit of the insert 16. Preferably the insert receiving region 18 is shaped to provide a surface which ensures at least three points of contact between the insert 16 and the insert receiving region 18. When properly fitted together the insert 16 and insert receiving region 18 form a flex joint. If the flex joint does not have a uniform coupling, vibrations or "chatter" may result when the flex tool is in use, adversely affecting the machining function.

Figure 3:
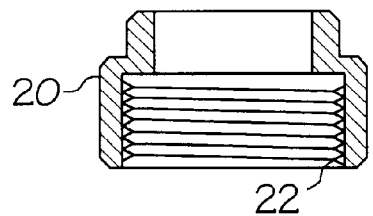
FIG. 3 is an enlarged side view perspective of the guide collar.

A guide collar 20 is loosely disposed about the lower portion 17 of the tool carrying body 14. In preferred embodiment the guide collar 20 has an inside threaded surface 22 (see FIG. 3), and the driver has an outside threaded surface 24, as shown in FIG. 1. The guide collar 20 is threadingly secured or screwed onto embodiments the guide collar and driver may be secured by a variety of means such as by utilization of a socket relationship, clamps, fasteners, or other attachment methods which may be known to one of ordinary skill in the art.

A retention ring assembly 26 prevents the tool carrying assembly from simply sliding out from the guide collar 20 and forces the insert 16 into uniform contact with the insert receiving region 18 when the guide collar is secured to the driver 10. In the embodiment shown in FIGS. 1, 2, 5 and 6, the insert 16 has an equatorial diameter equal to the lower portion 17. The diameter of the insert 16 is restricted where the insert 16 and lower portion 17 are joined. Retention ring assembly 26 is held, as a result of this restricted diameter, on the tool carrying body between the insert 16 and the lower portion 17. As previously stated the guide collar 20 is loosely disposed about the lower portion 17 of the tool carrying body 14. However, the inside diameter of the guide collar 20 while obviously greater than that of the tool carrying body 14 is less than that of the outside diameter of the restriction ring assembly 26.

In alternative embodiments the insert 16 may have various sizes and shapes. However, in any embodiment of the present invention the retention ring assembly 26 will be constructed to accomplish the various functions required as described herein, namely, retaining the guide collar 20 on the tool carrying body 14, and providing an upward force on the insert 16 when the guide collar 20 and driver 10 are secured together.

When the guide collar 20 is secured to the driver 10, the restriction ring assembly 26 is compressed between the guide collar 20 and the insert 16. As a result the restriction ring assembly 26 applies an upward force on insert 16 forcing insert 16 into uniform contact with insert receiving region 18 of the driver 10. The force supplied by the restriction ring assembly 26 may be increased to ensure proper coupling of the insert 16 and the insert receiving region 18, by including one or more tension rings 28 between the guide collar 20 and the restriction ring assembly 26. A washer (not shown) may further be included between the tension rings 28 and the guide collar 20 to prevent undesirable wear on either the guide collar 26 or the tension rings 28. As shown in FIG. 2 two tension rings 28 are shown, however this number may vary as desired.

It should be obvious to one of ordinary skill in the art that the force provided by the restriction ring assembly 26 may be modified in a variety of different ways besides the previously mention inclusion of one or more tension rings. The tension rings mentioned herein, as well as other devices known in the art, may have various physical characteristics which are known to increase or decrease the force supplied by the restriction ring assembly 26.

When the flex joint is formed by securing the insert 16 to the insert receiving region 18 by securing the guide collar 20 to the driver 10, the tool carrying body 14 theoretically has three degrees of rotational freedom and a virtually unlimited range of motion. However, in addition to the functions which the guide collar supplies to the present invention as described above, the guide collar may also serve to restrict the range of motion of the tool carrying body 14.

Figure 4:
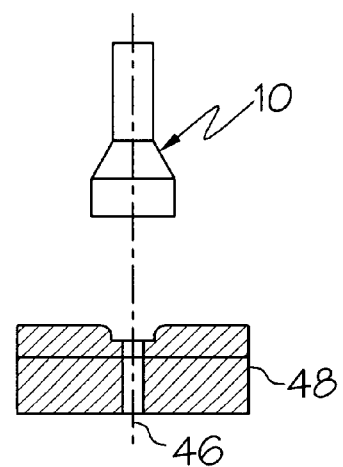
FIG. 4 shows the ideal alignment of the longitudinal axes of the driver and reference bore.
Figure 5:
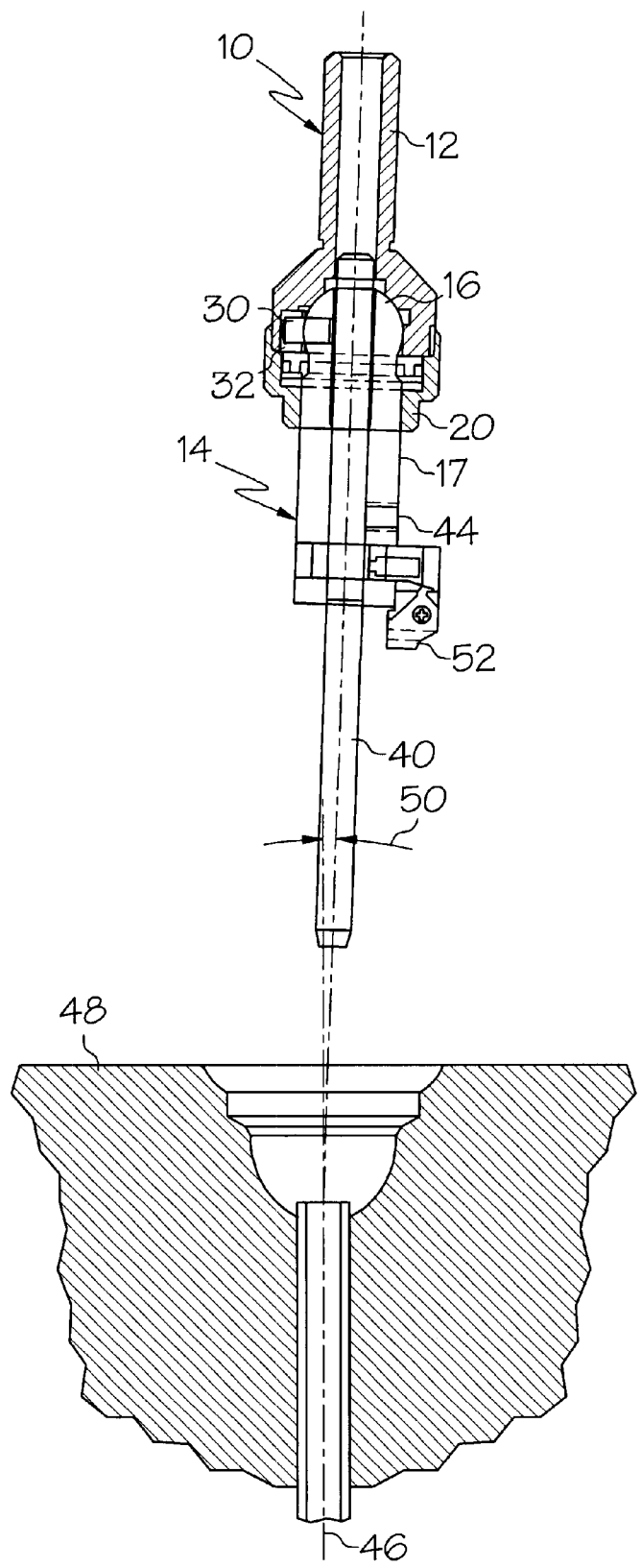
FIG. 5 shows an example of a misalignment angle between the longitudinal axis of the reference bore and the longitudinal axis of the driver.
Figure 6:
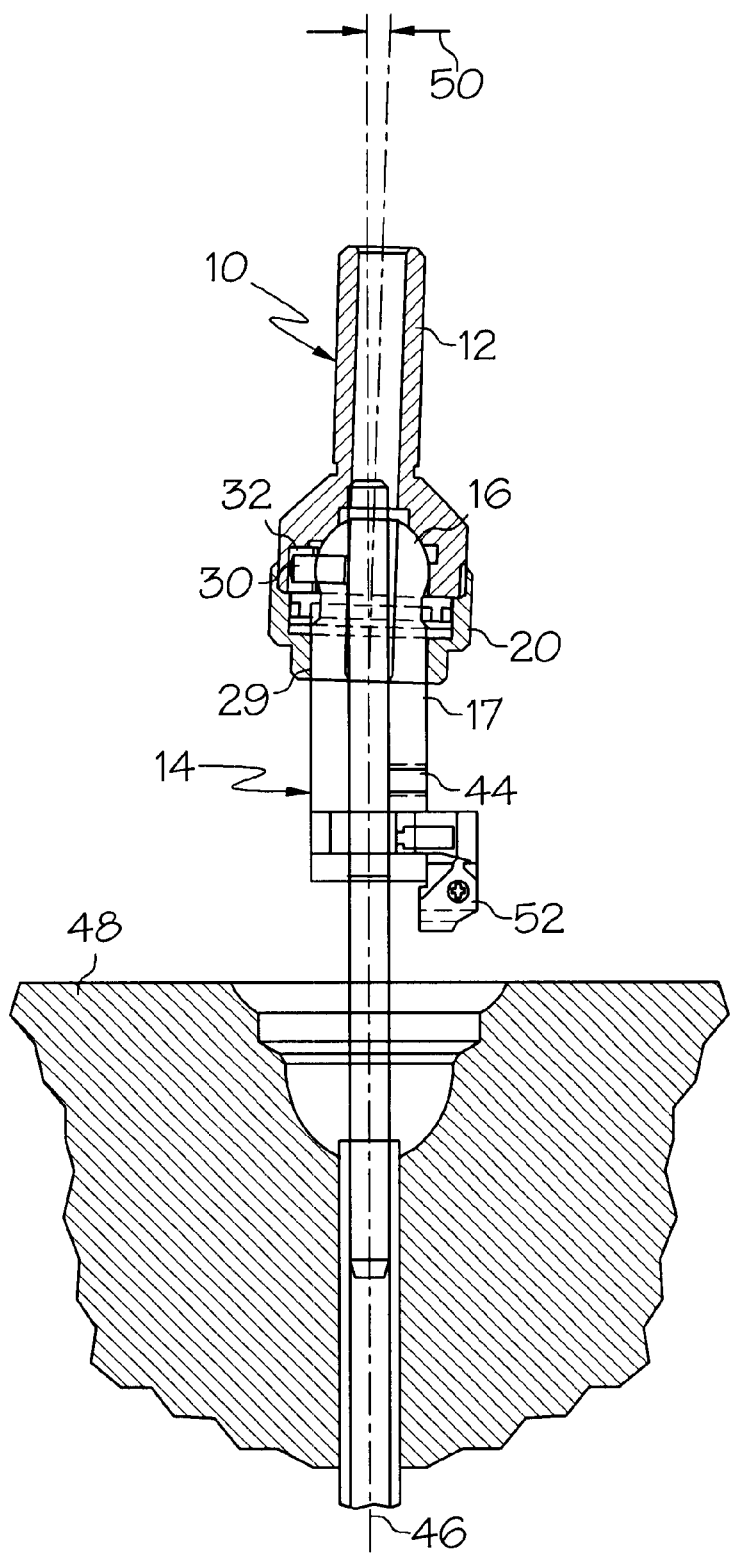
FIG. 6 shows the ability of the flex tool to compensate for the misalignment angle shown in FIG. 5.

As previously described the guide collar 20 is loosely disposed about the tool carrying body 14. As best shown in FIG. 6, the area between the guide collar 20 and the tool carrying body 14 defines a clearance 29. The tool carrying body 14 can only move within the confines of clearance 29 since the tool carrying body will come into contact with the guide collar 20 at some point. The guide collar 20 can be constructed to provide a clearance of varying widths and thus allow a variable range of motion relative to the longitudinal axis of the driver as shown in FIGS. 4 and 5. In the preferred embodiment disclosed herein the clearance 29 provides for a range of motion of the tool carrying body, based on the longitudinal axis of the tool carrying body, to be between 0 and 15 degrees relative to the longitudinal axis of the driver.

As best seen in FIGS. 1 and 2, insert 16 has a stop 30 which projects laterally therefrom. The insert receiving region 18 of the driver 10 is constructed so that the stop 30 is engaged by the driver 10 when the insert 16 and insert receiving region 18 are coupled together. Specifically, in the embodiment shown, the insert receiving region 18 includes a notched portion 32 which removably receives and engages the stop 30. As a result of the stop 30 being engaged by the notch 32, the tool carrying body 14 may be rotationally engaged by the driver 10 thereby preventing the tool carrying body 14 from rotating independently of the driver 10.

In the embodiment shown the engagement between the stop 30 and notch is not a tight fit. Notch 32 provides excess space around stop 30 to ensure that tool carrying body 14 via insert 16 retains two rotational degrees of freedom relative to the driver 10. As a result even when the stop 30 is engaged by the notch 32 the longitudinal axis of the tool carrying body 14 may be oriented independently of the longitudinal axis of the driver 10 to provide two rotational degrees of freedom.

As best seen in FIG. 2 an elongate pilot shaft 40 is held within the tool carrying body 14. The elongate pilot shaft 40 has a lower end 42 which extends downward from the tool carrying body 14. The lower portion 42 may be constructed to have a variable diameter in order to match the diameter of a wide range of reference bore types. In addition the elongate pilot shaft 40 may have a variable diameter, and as a result the tool carrying body 14 includes an adjustable securing means 44 which frictionally engages the elongate pilot shaft 40. The securing means 44 is typically an adjustable screw or bolt threaded through the lateral surface of the lower portion 17. The elongate pilot shaft 40 may also be constructed to facilitate the engagement of securing means 44 such as with the inclusion of depressions, notches, a ball detent, etc.

The elongate pilot shaft 40 is inserted into a reference bore 46 of a workpiece 48. The reference bore may be an inherent part of the construction of the workpiece 48 or may be specially bored in preparation to receive a machining tool such as presently disclosed. When a workpiece such as shown in FIGS. 4–6 is brought into general alignment with a machining tool such as when a machinist or operator approximates or "eyeballs" the alignment, quite often the pilot shaft 40 is not precisely aligned with the reference bore 46. This misalignment is referred to as a misalignment angle 50 and is best shown in FIG. 5. If the misalignment angle 50 is not corrected the pilot shaft 40 may not be properly received by the reference bore 46. If the misalignment angle 50 is slight it may be possible to force the pilot shaft 40 into the reference bore 46 but this may damage the workpiece 48 and result in improper machining.

As a result of the various features described above, the elongate pilot shaft 40 and the associated tool carrying body 14 can be readily repositioned in order to compensate for the misalignment angle 50. By inserting the elongated pilot shaft 40 into the reference bore 46, the longitudinal axis of the tool carrying body 14 and pilot shaft 40 will be repositioned to align with the longitudinal axis of the reference bore 46.

The actual machining of the workpiece 48 is accomplished by the rotation of a tool such as a cutter insert 52 carried by the tool carrying body 14. The cutter insert 52 may be an intrinsic part of the tool carrying body 14 but is more commonly connected to the tool carrying body 14 with a clamp or other attachment means. It should be obvious to one of ordinary skill in the art that the tool carrying body 14 may carry other tools or multiple configurations of tools in addition to or in place of cutter insert 52. Furthermore, it should also be obvious that any type of cutter insert, besides that which is shown in the various figures may be utilized with the tool carrying body 14.

This completes the description of the preferred and alternate embodiments of the invention. Those skilled in the art may recognize other equivalents to the specific embodiment described herein which equivalents are intended to be encompassed by the claims attached hereto.

What is claimed is:

1. A flex drive tool for machining a work piece, comprising:
    a first part and a second part, the first part coupled to the second part so as to allow the second part three rotational degrees of freedom with respect to the first part, the second part comprising an elongate pilot shaft, the elongate pilot shaft having a first longitudinal axis, the three rotational degrees of freedom allowing the first longitudinal axis of the elongate pilot shaft to be automatically aligned with a second longitudinal axis of a reference bore independent of the first part, the reference bore being positioned in a work piece.

2. The flex drive tool of claim 1, the reference bore having a predetermined diameter greater than or equal to the pilot shaft and defining the second reference longitudinal axis, the work piece being operatively engaged by the pilot shaft such that the pilot shaft is slidably received into the reference bore thereby aligning the first longitudinal axis of the elongate pilot shaft with the second longitudinal axis.

3. The flex drive tool of claim 2 wherein the second part further comprises a tool carrying body, the tool carrying body having a predetermined diameter, the tool carrying body disposed about the elongate pilot shaft, the pilot shaft being removably retained therein.

4. The flex drive tool of claim 3 wherein the first part is operably engaged by a machine.

5. The flex drive tool of claim 4 wherein the first part is a driver.

6. The flex drive tool of claim 5 wherein the driver and the tool carrying body are coupled by a flex joint.

7. The flex drive tool of claim 6 wherein the flex joint is formed by the coupling of a substantially spherical upper portion of the tool carrying body, and an upper portion receiving region of the driver, the upper portion receiving region constructed and arranged to receive and removably retain the substantially spherical upper portion of the tool carrying body.

8. The flex drive tool of claim 7 wherein the substantially spherical upper portion of the tool carrying body includes a stop which cooperates with the upper portion receiving region of the driver to restrict the tool carrying body to two rotational degrees of freedom with respect to the driver.

9. The flex drive tool of claim 8 wherein a guide collar is disposed about the tool carrying body the tool carrying body having a stop means, the stop means constructed and arranged to prevent the guide collar from being removed from the tool carrying body.

10. The flex drive tool of claim 9 wherein the stop means is a restriction ring assembly.

11. The flex drive tool of claim 10 wherein the guide collar and driver are constructed and arranged to be removably secured to one another.

12. The flex drive tool of claim 11 wherein the guide collar and driver are removably secured to one another, thereby bringing the substantially spherical upper portion of the tool carrying body into contact with the upper portion receiving region of the driver.

13. The flex drive tool of claim 12 wherein the guide collar has an inside diameter greater than that of the tool carrying body and wherein the difference between the inside diameter of the guide collar and the diameter of the tool carrying body determines an angular range of motion of the tool carrying body relative to the removably secured guide collar and driver.

14. The flex drive tool of claim 13 wherein the range of motion of the tool carrying body along the two rotational degrees of freedom is dependant upon the difference between the inside diameter of the guide collar and the diameter of the tool carrying body.

15. The flex drive tool of claim 14 wherein the longitudinal axis of the tool carrying body has a range of motion between 0 and 15 degrees along the two rotational degrees of freedom relative to the longitudinal axis of the driver.

16. The flex drive tool of claim 3 wherein a the tool carrying body further includes a fixed cutter.

17. The flex drive tool of claim 3 wherein a cutter insert is carried by the tool carrying body.

18. The flex drive tool of claim 3 wherein an attachment means is at least partially disposed about the tool carrying body, the attachment means having a cutter insert attached thereto.

19. The flex drive tool of claim 17 wherein the cutter insert is oriented to a predetermined angle relative to the longitudinal axis of the tool carrying body.

20. The flex drive tool of claim 12 wherein the substantially spherical upper portion is forcibly engaged by the restriction ring assembly when the guide collar and driver are secured to one another, thereby forcing the substantially uniform upper portion to uniformly contact the upper portion receiving region.

21. The flex drive tool of claim 20 wherein one or more tension rings are positioned between the guide collar and restriction ring assembly.

22. The flex drive tool of claim 21 wherein the one or more tension rings have an undulating shape, the undulating shape providing a biasing force on the restriction ring assembly when the guide collar and driver are removably secured.

23. The flex drive tool of claim 12 wherein the tool carrying body and the driver have a longitudinal throughbore, the elongate pilot shaft extending through the longitudinal throughbore into the driver longitudinal through bore, the elongate pilot shaft having a predetermined diameter, the driver longitudinal throughbore having a diameter which is larger than the diameter of the pilot shaft so that the pilot shaft has a predetermined angular adjustment range which is defined as an angle between 0 and a maximum predetermined angle, where the maximum predetermined angle is measured from the longitudinal axis of the driver throughbore and the longitudinal axis of the elongate pilot shaft when the elongate pilot shaft is abutting an inside surface of the driver throughbore.

24. The flex drive tool of claim 23 wherein the predetermined angular adjustment range is between 0 and 15 degrees.

* * * * *